Jan. 13, 1970   L. L. CARNAGHAN   3,489,988
IN-LINE CABLE CONNECTORS

Filed Sept. 22, 1967   2 Sheets-Sheet 1

INVENTOR.
LUASON L. CARNAGHAN
BY Philip Schneider
Louis B. Appleton
ATTORNEYS

Jan. 13, 1970     L. L. CARNAGHAN     3,489,988
IN-LINE CABLE CONNECTORS

Filed Sept. 22, 1967     2 Sheets-Sheet 2

INVENTOR.
LUASON L. CARNAGHAN
BY Philip Schneider
Louis B. Appleton
ATTORNEYS

United States Patent Office 3,489,988
Patented Jan. 13, 1970

3,489,988
IN-LINE CABLE CONNECTORS
Luason L. Carnaghan, Norwich, Conn., assignor to the United States of America as represented by the Secretary of the Navy
Filed Sept. 22, 1967, Ser. No. 669,960
Int. Cl. H01r 11/02, 13/54, 12/18
U.S. Cl. 339—60    9 Claims

ABSTRACT OF THE DISCLOSURE

An electrical cable connector for connecting coaxial to coaxial cable, coaxial to single-conductor cable, or single-conductor to single-conductor cable. The connector comprises five basic components; two cable terminations; means such as male and female contact pins for establishing electrical contact between the center conductors of the cables; a cylindrical main body enclosing the electrical contact means and partially enclosing and being screwed to the cable terminations; and waterproofing means such as O-rings. The O-rings are placed between the cable terminations and the main body and also between the cable teminations and the dielectric layer of the cable so that water cannot come inside the connector to make contact with the center conductor contact means. The largest outer diameter is no larger than the outer diameter of the cables so that the connector appears to be a portion of the cable itself as far as size is concerned.

---

The invention described herein may be manufactured and used by or for the Government of the United States of America for governmental purposes without the payment of any royalties thereon or therefor.

This invention relates to connectors for electrical cables and especially to waterproof electrical-cable connectors having an outer diameter which is substantially the same as that of the electrical cables which are being connected.

The U.S. Navy employs buoyant electrical cable of the type having a center conductor which is surrounded by a dielectric layer which, in turn, is surounded by a thick layer of buoyant material such as foamed polyethylene. Between the dielectric layer and the buoyant layer, there may also be a layer of braiding of conductive material and a sheath of solid polyethylene.

One such cable must frequently be connected to another cable of the same type and the connected cables must be reeled in and out through openings in the reeling equipment which are only slightly larger than the outer diameter of the cables. Thus, it is necessary that the connector between the cables have an outer diameter that is no larger than the outer diameter of the cables. Conventional cable connectors are bulkier than the cables they connect.

For the marine work, it is also necessary, where coaxial cables are being employed, that the connector be waterproof so that the sea water cannot short the braiding to the center conductor. A waterproof connector may also have to be employed for connecting single-conductor cable to coaxial cable.

Accordingly, an object of this invention is to provide a connector for electrical cable which has an outer diameter which is no larger than that of the cable.

A further object is to provide a connector as in the above object which is also waterproof.

These objects and advantages are accomplished by a connector having the following five basic components: two cable terminations, center-conductor contact means, means for enclosing said contact means, and waterproofing means. Each cable termination fits over the outer layer of the cable which is cut down so that the cable termination does not extend outside of the outer circumference of the cable. Similarly, the enclosing means fits over and is affixed to a reduced portion of the cable termination so that the enclosing means does not extend outside of the outer circumference of the cable. The waterproofing means seals off the openings between the dielectric layer of the cable and the cable termination and also between the cable termination and the enclosing means so that no water can reach the center-conductor contact means.

Other objects and advantages will appear from the following description of an example of the invention, and the novel features will be particularly pointed out in the appended claims.

Figure 1:
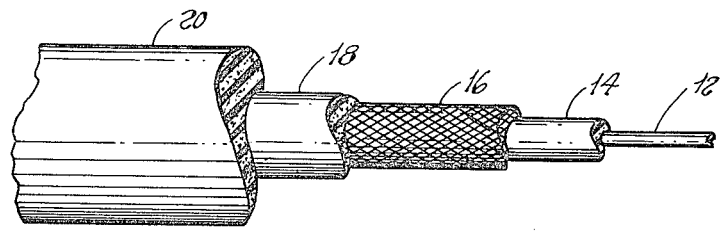
Figure 2:
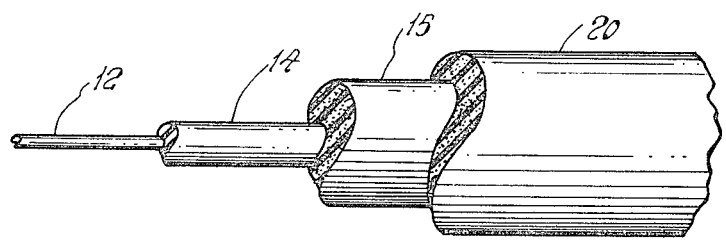
Figure 3:
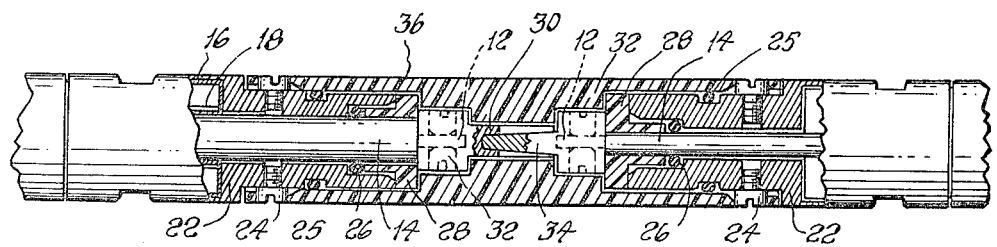
Figure 4:
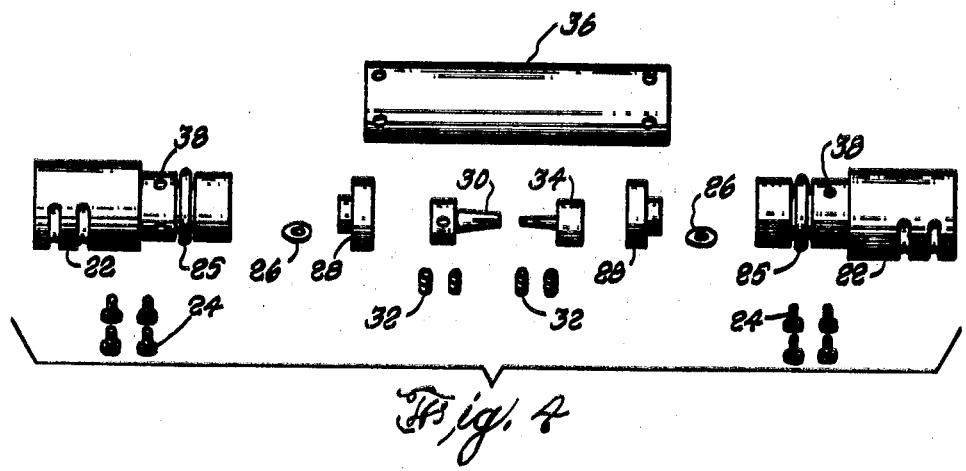
Figure 5:
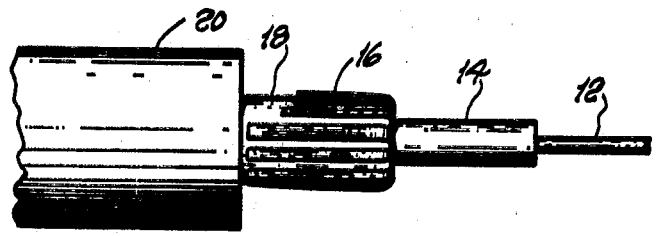

In the accompanying drawings:
FIG. 1 is a schematic representative of a section of buoyant coaxial cable cut away to show the different layers;
FIG. 2 is a schematic represenation of a section of buoyant single-conductor cable cut away to show the different layers;
FIG. 3 is a sectional view of a coaxial cable to single-conductor cable connector;
FIG. 4 is an exploded view of the connector illustrated in sectional view in FIG. 3; and
FIG. 5 is a schematic diagram illustrating how a coaxial cable is prepared for the installation of the cable termination.

Similar numerals refer to similar parts throughout the several views.

The in-line cable connectors which are the subject matter of this invention are used to connect buoyant electrical cables together. Basically, three types of connection are necessary: single-conductor cable to single-conductor cable; single-conductor cable to coaxial cable; and coaxial cable to coaxial cable.

The two types of cable are shown in FIGS. 1 and 2. FIG. 1 shows a typical coaxial cable, the various layers being cut away to illustrate the construction. There is a center conductor 12 of copper-coated steel, a dielectric layer 14 of polyethylene, a layer of metallic braiding 16 which forms the outer conductor, a sheath 18 of solid polyethylene, and a layer of buoyant, foamed polyethylene which forms the outer jacket 20 of the cable.

FIG. 2 shows a typical single-conductor cable with a center conductor 12, the dielectric layer 14 and two buoyant jackets of foamed polyethylene, an inner jacket 15 and the outer jacket 20. There is no layer of braiding in the single-conductor cable.

An in-line connector consists essentially of three parts, two cable terminations (also known as cable seal assemblies) and a central enclosing section (also known as the main body). FIG. 3 illustrates the component parts of a typical embodiment of a coaxial cable to single-conductor in-line connector (inflexible type). The coaxial cable termination includes a cable collar 22 which has a portion with a large outer diameter which is equal to the smallest allowable outer diameter of the electrical cable. Another portion has a smaller outer diameter with a circumferential recess which houses an O-ring 25. The outer diameter of the O-ring 25 is slightly larger than the outer diameter of the portion of the cable collar 22 on which it is located. There is also another, small O-ring 26, an O-ring follower 28 and a female conductor contact, or pin, 30.

The single-conductor termination includes a cable collar 22, large O-ring 25, small O-ring 26, insulating O-ring follower 28, and male conductor contact, or pin, 34.

The central enclosing section, or main body, 36 is the final component except for the fastening screws.

The male and female contacts 34 and 30 fit over the center conductor 12 of the cables and each is fastened to its conductor by a pair of set screws 32. The main body 36 is roughly cylindrical in shape, the outer surface having the same diameter as the larger outer diameter of the cable collars 22 and the inner surface having different diameters according to the portion of the cable termination which it encloses. The main body 36 is fastened to the cable collars by a set of self-locking, fillister-head set screws 24, which fit into screw holes 38 in the cable collars 22.

The cable collar for a coaxial cable may have different inner dimensions than for a single-conductor cable collar depending on the diameters of the various layers of the types of cable which are being connected but, aside from this, the shapes are substantially the same.

The typical materials which can be used for the components of the connector are the following:

cable collar—stainless steel
O-rings—neoprene rubber
O-ring follower—nylon
male and female contacts—silver-coated brass main
  body—nylon
set screws—stainless steel In assembling the coaxial cable seal assembly, the coaxial cable is trimmed back approximately as shown in FIG. 5. The outer jacket 20 of the cable is trimmed down by an amount substantially the same as the thickness of the wall of the cable collar 22 where the latter fits over the outer jacket 20.

The cable is trimmed down at its end to uncover a small portion of the center conductor 12. A longer portion of the dielectric layer 14 is uncovered and the braiding 16 which lies along this section of the dielectric is smoothed back over the smaller section of the outer jacket 20 so that good electrical contact is made with the cable collar 22 when the latter is forcibly pushed into place on the small portion of the jacket 20. The small O-ring 26 is then dropped into the recess between the other end of the cable collar 22 and the exposed dielectric layer 14 of the cable and then is forced back by the O-ring follower 28. The size of the O-ring 26 is such that watertight contact is made by the O-ring 26 with the dielectric layer 14 and the cable collar 22. The conductor contact 30 is then fastened in place over the central conductor portion of the cable. The assembly of the single-conductor cable seal assembly is essentially the same operation.

The cable terminations are set into the main body 36, the male contact 34 fitting tightly into the female contact 30, and the main body is then fastened to the cable collars 22 by the set screws 24. Watertight contact is made by the larger O-ring 25 with the inside surface of the main body 36 and the outside surface of the cable collar 22. Because of the O-rings, no water can seep through the cable seal assembly into the central area where the center conductor is located even if the sheath 18 is not waterproof.

If the sheath 18 is waterproof, a slightly different embodiment may be employed. The O-ring follower 28 may be made of metal and the braiding 16 is no longer folded back over the small portion of the outer jacket 20 but is folded back to make contact with the end of the O-ring follower, a ring-like insulating washer now being positioned between the O-ring follower 28 and the conductor contact 30.

The proper cable terminations are selected for the three basic types of cable connection. Since, in the coaxial cable-to-coaxial cable connection, the braiding is electrically connected to the cable collar and the collar is in contact with the sea water, electrical contact between the braidings of the two connected cables is made through the sea water.

One final advantage of the connector should be mentioned. All connections to the cable and between the various components are mechanical—no soldering is necessary. Thus, there is no possibility of melting any of the insulation or other parts of the cable and weakening the cable or the connection.

I claim:
1. An in-line connector for electrically connecting a pair of cables, said cables being of the type having at least a center conductor, a dielectric layer surrounding said center conductor and an outer layer of electrically nonconductive material surrounding said dielectric layer, the outer diameters of the cables being substantially equal, said connector comprising in combination:
   a pair of collar means of electrically conductive material, one for each cable, a portion of the collar means being fitted tightly over a portion of the outer layer of its associated cable which is reduced in area so that the outer diameter of the largest-area section of the collar means is no larger than the outer diameter of the cable;
   means for establishing electrical contact between the center conductors of the two cables;
   insulating means located between each said collar means and its associated means for establishing electrical contact between the center conductors;
   waterproofing means; and
   central enclosing means formed of electrically nonconductive material impervious to water for forming an enclosure around said means for establishing electrical contact, the outer diameter of said enclosing means being no larger than the outer diameter of a cable, said enclosing means being affixed to said collar means on each cable,
said waterproofing means being in close contact with and forming a waterproof seal between said enclosing means and each said collar means and also being in close contact with and forming a waterproof seal between the dielectric layer of each cable and its associated collar means, whereby water cannot penetrate said connector and come into contact with said means for establishing electrical contact between the center conductors or with the center conductors themselves.

2. A connector as set forth in claim 1, wherein said collar means is formed in two sections, the outer diameter of one section being smaller than that of the other, said central enclosing means fitting over the smaller portion and the larger portion being fitted over said portion of the outer layer of its associated cable which is reduced in area.

3. A connector as set forth in claim 2, wherein said waterproofing means comprise water-impervious, resilient O-rings and said insulating means comprise a pair of O-ring followers, each follower being used to push an O-ring into place between the dielectric layer of a cable and its associated collar means and to provide electrical insulation between a collar means and its associated means for establishing electrical contact.

4. A connector as set forth in claim 2, wherein said means for establishing electrical contact comprises a male and a female contact pin of electrically conductive material.

5. A connector as set forth in claim 2, wherein said collar means and said central enclosing means are circular in circumferential configuration, said cables being the same in circumferential configuration.

6. An in-line connector for electrically connecting a pair of cables, said cables being of the type having at least a center conductor, a dielectric layer surrounding said center conductor and an outer layer of electrically nonconductive material surrounding said dielectric layer, the outer diameters of the cables being substantially equal, said connector comprising, in combination:
   a pair of collar means of electrically conductive material, one for each cable, a portion of the collar means being fitted tightly over a portion of the outer layer of its associated cable which is reduced in area so that the outer diameter of the largest-area section of the collar means is no larger than the outer diameter of the cable;

means for establishing electrical contact between the center conductors of the two cables;

insulating means located between each said collar means and its associated means for establishing electrical contact between the center conductors;

waterproofing means; and central enclosing means formed of electrically nonconductive material impervious to water for forming an enclosure around said means for establishing electrical contact, the outer diameter of said enclosing means being no larger than the outer diameter of a cable, said enclosing means being affixed to said collar means on each cable, said waterproofing means being in close contact with and forming a waterproof seal between said enclosing means and each said collar means and also being in close contact with and forming a waterproof seal between the center conductor of each cable and its associated collar means, whereby water cannot penetrate said connector and come into contact with said means for establishing electrical contact between the center conductors or with the center conductors themselves.

7. A connector as set forth in claim 6, wherein said waterproofing means comprise water-impervious, resilient O-rings and said insulating means comprise a pair of O-ring followers, each follower being used to push an O-ring into place between the center conductor of a cable and its associated means for establishing electrical contact and to provide electrical insulation between a collar means and its associated means for establishing electrical contact.

8. An in-line connector for electrically connecting a pair of cables, said cables being of the type having at least a center conductor, a dielectric layer surrounding said center conductor and an outer layer of electrically nonconductive material surrounding said dielectric layer, the outer diameters of the cables being substantially equal, said connector comprising, in combination:

a pair of collar means of electrically conductive material, one for each cable, a portion of the collar means being fitted tightly over a portion of the outer layer of its associated cable which is reduced in area so that the outer diameter of the largest-area section of the collar means is no larger than the outer diameter of the cable;

means for establishing electrical contact between the center conductors of the two cables;

insulating means located between each said collar means and its associated means for establishing electrical contact between the center conductors;

waterproofing means; and central enclosing means formed of electrically nonconductive material impervious to water for forming an enclosure around said means for establishing electrical contact, the outer diameter of said enclosing means being no larger than the outer diameter of a cable, said enclosing means being affixed to the collar means on each cable, said waterproofing means being in close contact with and forming a waterproof seal between said enclosing means and each said collar means, and also being in close contact with and forming a waterproof seal between said collar means and the center conductor on one cable and the collar means and the dielectric layer on the other cable, whereby water cannot penetrate said connector and come into contact with said means for establishing electrical contact between the center conductors or with the center conductors themselves.

9. A connector as set forth in claim 8, wherein said waterproofing means comprise water-impervious, resilient O-rings and said insulating means comprise a pair of O-ring followers, said followers being used to push an O-ring into place between the center conductor and its associated collar means on one cable and between the dielectric layer and its associated collar means on the other cable, said followers also providing electrical insulation between each collar means and its associated means for establishing electrical contact.

References Cited

UNITED STATES PATENTS

| | | | |
|---|---|---|---|
| 2,677,813 | 5/1954 | Sharp | 339—274 |
| 3,181,105 | 4/1965 | Roach et al. | 339—94 |
| 3,397,377 | 8/1968 | Potter | 339—60 |

MARVIN A. CHAMPION, Primary Examiner

J. H. McGLYNN, Assistant Examiner

U.S. Cl. X.R.

339—92, 177